United States Patent [19]

Date

[11] 4,145,011
[45] Mar. 20, 1979

[54] FILM WIND-UP MECHANISM RELEASING DEVICE

[75] Inventor: Nobuaki Date, Kawasaki, Japan

[73] Assignee: Canon Kabushiki Kaisha, Tokyo, Japan

[21] Appl. No.: 761,856

[22] Filed: Jan. 24, 1977

[30] Foreign Application Priority Data

Jan. 29, 1976 [JP] Japan .................................. 51/8791

[51] Int. Cl.² ............................ G03B 1/04; G03B 1/24; G03B 19/04
[52] U.S. Cl. ..................................... 242/71.6; 354/214
[58] Field of Search ............................... 242/71–71.6; 354/206, 212–216

[56] References Cited

U.S. PATENT DOCUMENTS

| | | | |
|---|---|---|---|
| 3,485,156 | 12/1969 | Takahashi et al. | 242/71.6 X |
| 3,598,033 | 8/1971 | Sasaki | 242/71.6 X |
| 3,645,182 | 2/1972 | Kimura | 242/71.4 X |

Primary Examiner—Harvey C. Hornsby
Assistant Examiner—John M. Jillions
Attorney, Agent, or Firm—Toren, McGeady and Stanger

[57] ABSTRACT

A device for releasing a film wind-up mechanism used for winding up film by driving a sprocket which is interlocked with a film wind-up means. The device is provided with a means for releasing the sprocket and the film wind-up mechanism from their states of being interlocked with each other when a preset number of film frames have been wound up.

4 Claims, 6 Drawing Figures

FILM WIND-UP MECHANISM RELEASING DEVICE

BACKGROUND OF THE INVENTION

1. Field of the Invention

This invention relates to a film wind-up mechanism releasing device and more particularly to a device which releases a sprocket from engagement with a film wind-up mechanism when photographing has been completed covering a preset number of frames of film by automatically detecting the completion.

2. Description of the Prior Art

Heretofore, film rewinding after completion of photographing covering a preset number of film frames has required that a sprocket which is under engagement with a film wind-up means including a gear interlocked with a film wind-up lever must be disengaged from the film wind-up means by operating a rewind button or a so-called R button. However, this operation is not essentially related to the photographing operation by a camera. Besides, in cases where a camera is equipped with a motor drive device for film winding and rewinding operations by motors, the necessity of such a disengaging operation hinders the full automation of such winding and rewinding operations.

It is therefore an object of this invention to solve the above mentioned problem by the provision of a device which detects completion of photographing when photographing has been made to the last frame of film and which then automatically disengages a sprocket from a film wind-up means to permit film rewinding.

It is another object of this invention to provide an arrangement to effect release locking when it is detected that the last film frame has been wound up.

It is still another object of this invention to provide an arrangement to effect full automatic film winding and rewinding operations when there is provided a motor drive device.

The above and other objects of this invention will become more apparent from the following detailed description of embodiments thereof when read in conjunction with the accompanying drawings.

DESCRIPTION OF THE PREFERRED EMBODIMENTS

Figure 1:
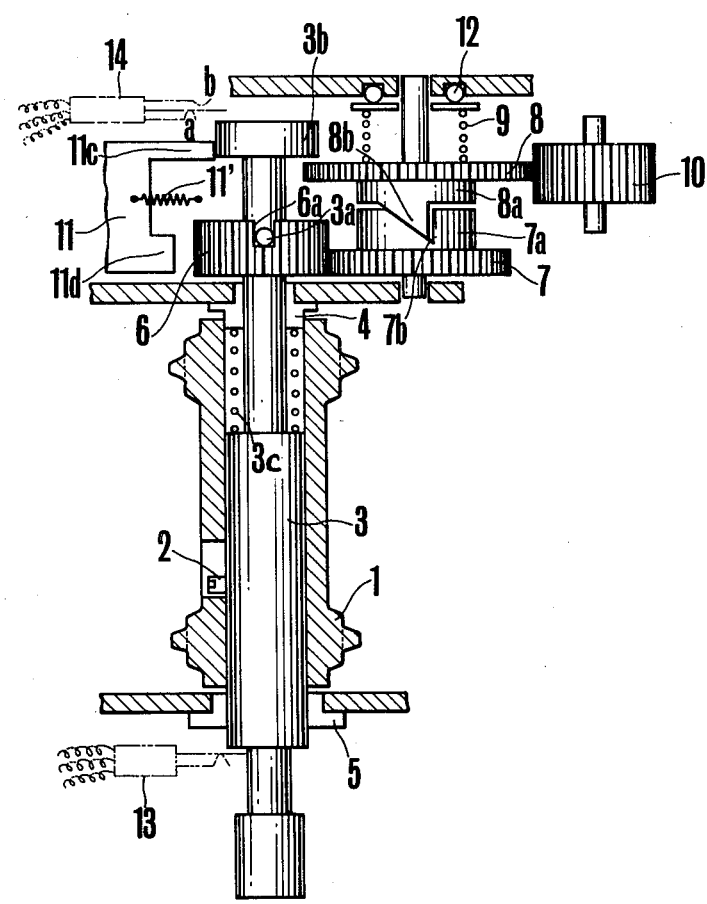
FIG. 1 illustrates the construction of an embodiment of the invented film wind-up mechanism releasing device for a camera.
Figure 2:
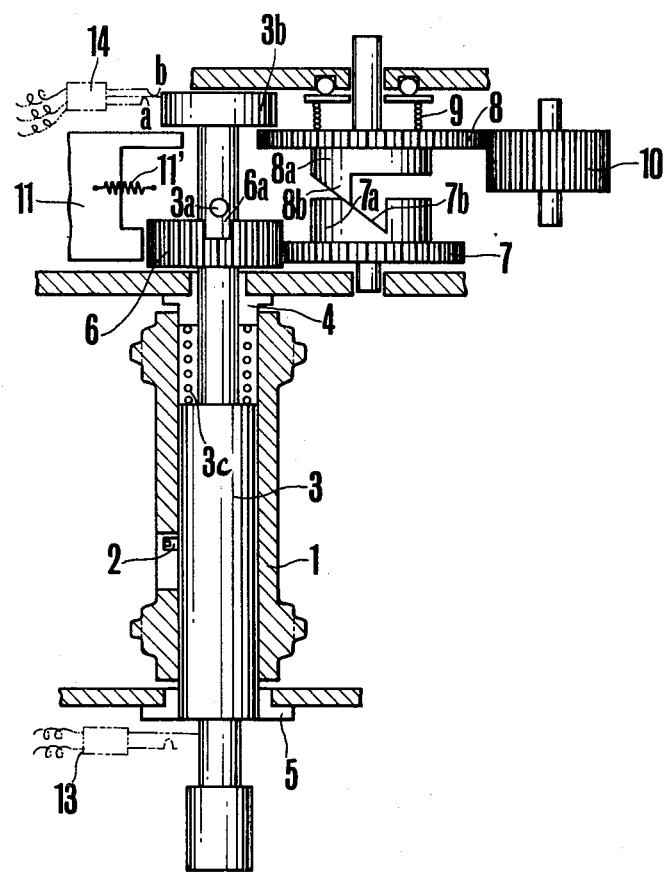
FIG. 2 illustrates the construction of the releasing device illustrated in FIG. 1 as in a releasing state.
Figure 3:
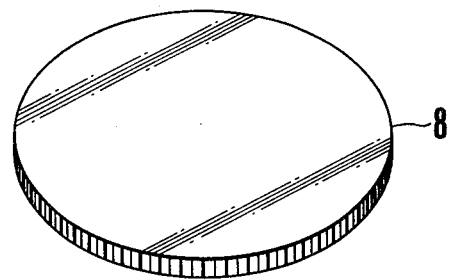
FIG. 3 illustrates a part of a torque sensor shown in FIGS. 1 and 2.
Figure 3:
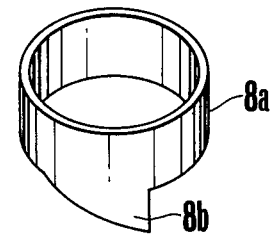
Figure 3:
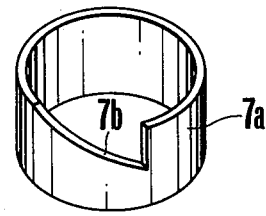
Figure 3:
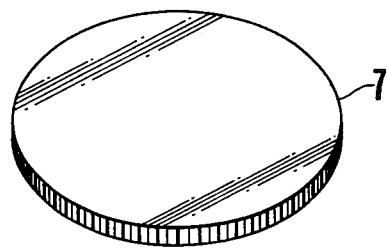

An embodiment of the film wind-up mechanism releasing device of this invention is illustrated in FIG. 1 in a non-releasing state and in FIG. 2 in a releasing state. Referring to FIGS. 1 and 2, a reference numeral 1 indicates a sprocket; and 2 indicates a screw mounted in a sprocket shaft 3. The screw 2 is provided for connecting the sprocket 1 to the sprocket shaft 3 in the direction of rotation. Reference numerals 4 and 5 indicate bearings for the sprocket shaft 3 and are inserted in a camera body to hold the sprocket shaft 3. A reference numeral 6 indicates a gear which is disposed on the sprocket shaft 3 to be freely rotatable thereon. The gear 6 is provided with a notch 6a in one end thereof. A protrudent pin 3a mounted in the sprocket shaft 3 is removably fitted in the notch 6a. A reference numeral 7 indicates a gear which engages with the gear 6. The relation of the gear 7 to another gear 8 can be better understood from the illustration of FIG. 3. The gears 7 and 8 are disposed to confront each other. The gear 7 is provided with a cylindrical part 7a which has a tapered notch portion 7b while the gear 8 is provided with a cylindrical part 8a which has a tapered protrudent portion 8b. The gear 8 being pressed downward by the force of a spring 9, the protrudent portion of the cylindrical part 8a is forced to constantly engage with the notch portion 7b of the cylindrical part 7a. Under such a condition, the gears 7 and 8 rotate as one unit. However, when the gear 7 is being prevented from rotating, if the gear 8 rotates clockwise, the tapered protrudent portion 8b of the cylindrical part 8a moves to ride on the tapered notch portion 7b of the cylindrical part 7a and the gear 8 thus moves upward. A torque sensor is thus composed of these gears 7 and 8 and the spring 9. A reference numeral 10 indicates a film feeding gear interlocked with a film wind-up lever (not shown in the drawings), the gear 10 being arranged to engage with the gear 8; and 11 indicates a torque urging member which is urged by a spring 11' to the right as viewed in FIG. 1. One end of the member 11 is in a forked shape. One of the forked end portions 11c of the member 11 is in pressed contact with the end face of a disc shaped part 3b secured to the upper end of the sprocket shaft 3. A reference numeral 12 indicates ball members which are provided for the purpose of facilitating the rotation of the gear 8 under the force of the spring 9. The arrangement described in the foregoing operates in the following manner:

When film has not been wound up to the end, parts are coupled to each other as illustrated in FIG. 1. Then, with the unillustrated film wind-up lever rotated, the gear 10 which is interlocked with the lever is rotated counter-clockwise. The gear 8 which engages with the gear 10 is rotated clockwise. With the gear 8 rotated clockwise, a clockwise rotating force is imparted to the gear 7 because of the spring 9 which is urging the protrudent portion 8b of the gear 8 and the notch portion 7b of the gear 7 to engage with each other. This causes the gear 7 also to rotate clockwise. Then, the gear 6 which engages with the gear 7 rotates counter-clockwise. The protrudent pin 3a which is fitted in the notch 6a of the gear 6 then also rotates counter-clockwise. By this, the sprocket shaft 3 and the sprocket 1 are rotated counter-clockwise to move the film forward. When a preset number of film frames including the rear end frame of the film have been forwarded, the sprocket 1 receives film tension, which prevents the operation of the film wind-up lever (not shown) from causing the sprocket shaft 3 and gears 6 and 7 to rotate. Therefore, when the gear 8 rotates clockwise as mentioned in the foregoing in response to the operation of the film wind-up lever (not shown), the tapered protrudent portion 8b of the gear 8 comes to ride on the tapered notch portion 7b of the gear 7 and the gear 8 thus moves upward there. This causes the disc part 3b of the sprocket shaft 3 to be pushed upward to disengage the protrudent pin 3a from the notch 6a of the gear 6. Then, the torque urging member 11 is released from the above mentioned engagement with the disc part 3b to be freely urged by the spring 11' to the right. The part 11d of one end of the member 11 comes into pressed contact with the end face of the gear 6 exerting a pressure to prevent the gear 6 from rotating. Meanwhile, another part 11c of one end of the member 11 is restricting the descent of the disc part 3b. When the film wind-up lever (not shown) is further rotated, the gear 8 further moves upward until the disc part 3b is pushed against the camera body. This results in an increase in the wind-up torque to inform the photographer that the photographing operation has been made to the end of the film. Then, the film is rewound under such a condition by operating a film rewinding member (not shown). Since the sprocket shaft has been disengaged from the gear 6, a film rewinding shaft (not shown) rotates in the rewinding direction to effect film rewinding.

Figure 4:
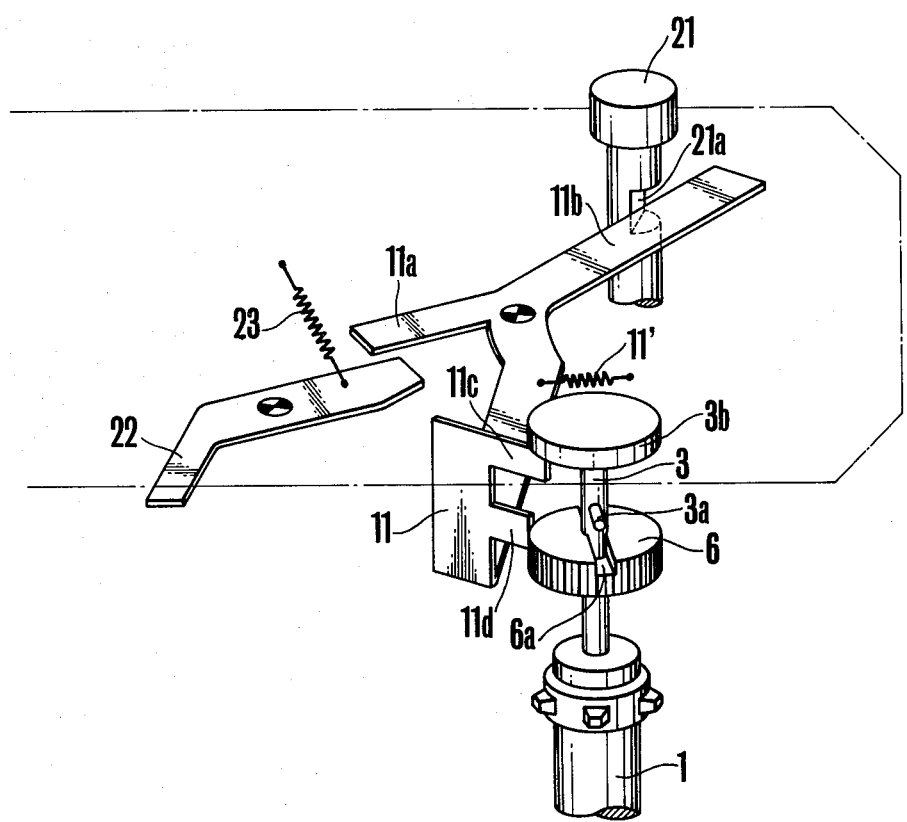
FIG. 4 is a schematic illustration of a release lock mechanism applicable to a camera which is equipped with the releasing device illustrated in FIGS. 1 and 2.

FIG. 4 illustrates, as an example, an arrangement to automatically lock a release button when the sprocket is disengaged from the gear in the invented film wind-up releasing device illustrated in FIGS. 1 and 2. In FIG. 4, parts corresponding to those shown in FIGS. 1 and 2 are indicated by like reference numerals. Of these reference numerals, 11a and 11b indicate arm parts which constitute the torque urging member 11; 21 indicates a release lever; 21a indicates a notch provided in the release lever 21; 22 indicates a signal lever connected to a rear cover of the camera which is not illustrated; and 23 indicates a spring. The release lock mechanism illustrated in FIG. 4 operates in the following manner:

When one part 11d of one end of the torque urging member 11 comes into pressed contact with the gear 6 as shown in FIG. 2, the arm 11b also rotates counter-clockwise and thus comes into the notch 21a of the release lever 21. This prevents the release lever from moving downward so that release can not be effected under this condition. This indicates that release lock is made when photographing has been made to the end of the film to prevent further photographing thereafter. The release lock can be undone by opening the unillustrated rear cover of the camera. With the rear cover opened, the spring 23 causes the lever 22 connected to the rear cover to rotate counter-clockwise. Then the arm 11b rotates clockwise to undo the release lock.

Further, with the rear cover opened, and with the lever 22 rotated counter-clockwise by the spring 23, the torque urging member 11 rotates clockwise to release the part 11d of one end thereof from its pressed contact with the gear 6. This allows the sprocket shaft 3 to rotate while, at the same time, the spring 3c pushes the sprocket shaft 3 downward. Then, even if the pin 3a fails to fit into the notch 6a due to phase deviation, the pin 3a is positioned to be in contact with the upper surface of the gear 6 to allow the part 11c of one end of the torque urging member 11 to be in pressed contact with the disc part 3b. Therefore, when the rear cover is closed and the wind-up lever is operated to rotate the gear 6, the pin 3a comes into the notch 6a to cause the sprocket shaft 3 to rotate again.

Figure 5:
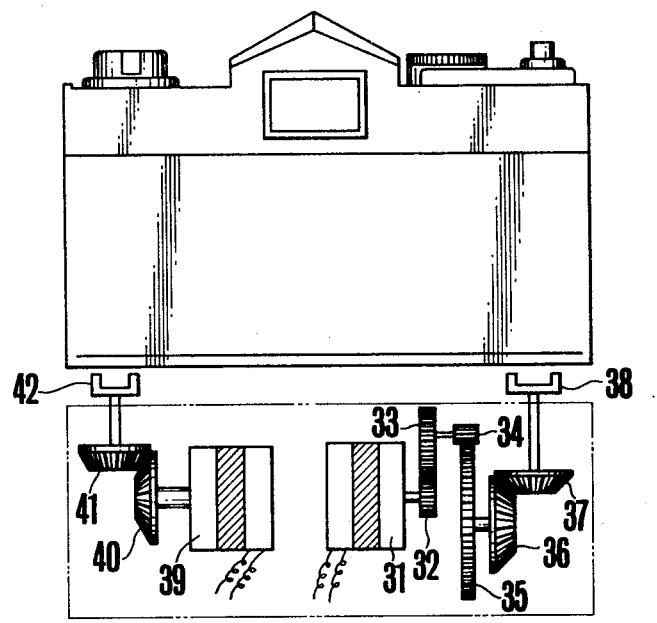
FIG. 5 is a schematic illustration of a motor drive device which is attachable and detachable to and from a camera equipped with the invented releasing device illustrated in FIGS. 1 and 2.
Figure 6:
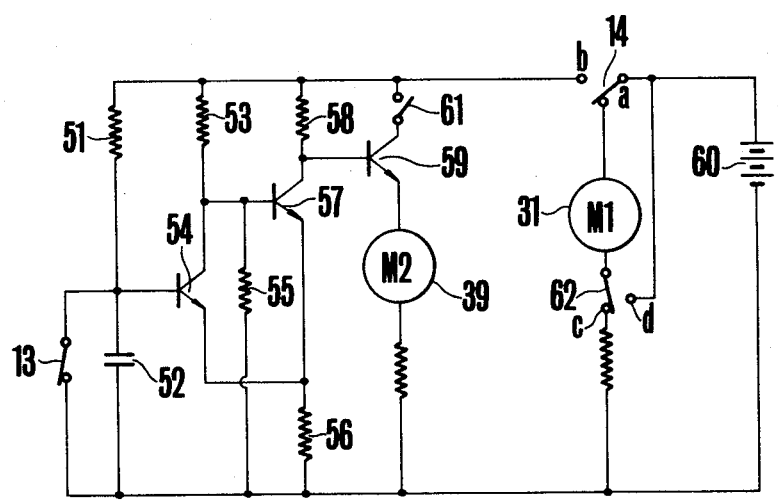
FIG. 6 is a circuit diagram illustrating the motor drive device illustrated in FIG. 5.

FIGS. 5 and 6 illustrate as an example the arrangement and the circuit of the film wind-up releasing device of the invention illustrated in FIGS. 1 through 4, the device being illustrated in FIGS. 5 and 6 as applied to a motor drive device. In FIG. 5, a reference numeral 31 indicates a motor for winding up film; 32 through 37 indicate gears which constitute a winding gear train; 38 indicates a wind-up coupler; 39 indicates a rewinding motor; 40 and 41 indicate gears which constitute a rewinding gear train; and 42 indicates a rewinding coupler. In FIG. 6 which illustrates the main circuit arrangement of the motor drive device, a reference numeral 60 indicates a power source; 31 and 39 indicate motors shown in FIG. 5; 51 indicates a resistance; 52 indicates a capacitor which forms a time constant circuit together with the resistance 51. Reference numerals 53, 55, 56 and 58 indicate resistances; and 54, 57 and 59 indicate transistors which in combination with these resistances form a switching circuit. A reference numeral 13 indicates a switch which is shown by dotted lines in FIGS. 1 and 2; 14 indicates a switch which is also shown by dotted lines in FIGS. 1 and 2 and which is provided with contacts a and b. A reference numeral 61 indicates a rewinding stop switch which is turned off in a known manner upon completion of a rewinding operation. A reference numeral 62 indicates a winding control switch which shifts to a side C upon completion of a winding up operation and is controlled by a known circuit and a known mechanism.

Referring to FIGS. 1 through 5, the operation of the invented device as applied to a motor drive device is described as follows:

In winding up film under a normal condition, the switch 14 is connected to a contact a as shown in FIG. 1 and the switch 13 is on to have a power supply to the motor 31. Under this condition, the film is wound up for each photographing operation through an unillustrated known arrangement of mechanism and circuit with the switch 62 shifted. Then, with the film having come to its end, the sprocket shaft is disengaged from the gear 6; the switch 14 shifts from the contact a to the contact b; and the switch 13 is turned off. By this, after a certain length of time determined by the capacitor 52 and the resistance 51, the transistor 59 is turned on to supply an electric power to the film rewinding motor 39. The rewinding coupler rotates through the gear train 40 and 41 to automatically rewind the film. If the film rewinding operation is made immediately after the winding up operation, an excessively large load would be imposed on the camera mechanism. The time constant circuit is provided for the purpose of preventing such. Upon completion of rewinding, the switch 61 is turned off to stop the rewinding operation.

As detailed in the foregoing, in accordance with this invention, winding up of film to its end is automatically detected and the film wind-up mechanism is released from its engagement with the sprocket. This obviates the necessity of operating an R button. Besides, where a motor drive device is employed, the film rewinding operation can be accomplished in a fully automatic manner. The film wind-up device of the invention therefore brings about great advantages when used in a camera.

What is claimed is:

1. A film wind-up mechanism for a camera, comprising:
    a sprocket for feeding film;
    a sprocket shaft for said sprocket, said sprocket shaft being arranged to be rotatable together with said sprocket in the same direction of rotation and to be shiftable in the axial direction thereof between a first position at which film feeding can be effected and a second position at which film feeding cannot be effected;

urging means which constantly urges said sprocket shaft to normally hold the sprocket shaft at said first position;

a first rotating member which is drivingly engaged with said sprocket shaft when the sprocket shaft is in the first position and is released from driving engagement with said sprocket shaft when the sprocket shaft shifts to the second position;

a second rotating member rotating in response to a manual film wind-up operation; and transmitting means for transmitting the rotative force of said second rotating member to said first rotating member, said transmitting means including torque detecting means which detects the value of the torque of the film wind-up operation relative to a prescribed value, and moving means which causes said sprocket shaft to shift from said first position to said second position thereof when said torque detecting means detects that said torque is at or above said prescribed value;

said film wind-up mechanism operating such that the rotative force of said second rotating member is transmitted to said sprocket shaft when the winding torque is less than said prescribed value and causes the moving means to shift said sprocket shaft to said second position when the winding torque is at or above said prescribed value.

2. A film wind-up mechanism releasing device according to claim 1 including;

a retaining means for retaining said sprocket shaft in the second position thereof, and a releasing means for releasing said retaining means from its retaining action.

3. A film wind-up mechanism for a camera, comprising:

a sprocket for feeding film;

a sprocket shaft for said sprocket, said sprocket shaft being arranged to be rotatable together with said sprocket in the same direction of rotation and to be shiftable in the axial direction thereof between a first position at which film feeding can be effected and a second position at which film feeding cannot be effected;

first urging means which constantly urges said sprocket shaft to normally hold the sprocket shaft at said first position thereof;

a first rotating member having a coupling part, said first rotating member being coupled to said sprocket shaft by said coupling part when the sprocket shaft is at said first position and decoupled from said sprocket shaft when said sprocket shaft is at said second position;

a second rotating member rotating in response to a manual film wind-up operation; and transmitting means for transmitting the rotative force of said second rotating member to said first rotating member, said transmitting means including (a) a third rotating member drivingly engaged with said first rotating member, said third rotating member being provided with a tapered notch portion, (b) a fourth rotating member drivingly engaged with said second rotating member, said fourth rotating member being provided with a protruding portion which frictionally engages said tapered notch portion of the third rotating member, means mounting said fourth rotating member for shifting movement between an engaging position at which said protruding portion of the fourth rotating member frictionally engages said tapered notch portion and a raised position at which said protruding portion disengages from said tapered notch portion said fourth rotating member when in said raised position moving said sprocket shaft to said second position and (c) second urging means which urges said fourth rotating member to be held at said engaging position at which said protruding portion frictionally engages said tapered notch portion;

said mechanism operating such that, when film wind-up torque is below a prescribed value, the rotative force of said fourth rotating member is transmitted to said third rotating member by the engagement of said protruding portion with said notch portion to carry out film feeding and, when the film wind-up torque is at or above said prescribed value, said protruding portion disengages from said notch portion and slides over said tapered notch portion and said fourth rotating member moves to said raised position to cause said sprocket shaft to shift to said second position at which film feeding cannot be effected.

4. A film wind-up mechanism according to claim 3, further comprising:

switching means which closes when said sprocket shaft moves to said second position thereof; and an electrical driving device for said camera, said driving device having a film rewinding coupler and driving means for actuating said rewinding coupler, said driving means being arranged to be operated when said switching means closes.

* * * * *